United States Patent [19]

Fox et al.

[11] Patent Number: 4,762,896

[45] Date of Patent: Aug. 9, 1988

[54] PROCESS FOR PREPARING AROMATIC POLYCARBONATE OF IMPROVED MELT PROCESSABILITY WITH FATTY ACID

[75] Inventors: Daniel W. Fox, Pittsfield; Andrew A. Martin; Edward N. Peters, both of Lenox, all of Mass.

[73] Assignee: General Electric Company, Pittsfield, Mass.

[21] Appl. No.: 12,733

[22] Filed: Feb. 9, 1987

Related U.S. Application Data

[63] Continuation of Ser. No. 687,010, Dec. 28, 1984, abandoned.

[51] Int. Cl.$^4$ ............................................. C08G 63/62
[52] U.S. Cl. .................................... 525/462; 524/300; 524/322; 528/196; 528/486
[58] Field of Search ............... 525/462; 528/486, 196; 524/322, 300

[56] References Cited

U.S. PATENT DOCUMENTS

| | | | |
|---|---|---|---|
| 3,153,008 | 10/1964 | Fox | 260/47 |
| 4,018,750 | 4/1977 | Onizawa | 260/78 A |
| 4,123,436 | 10/1978 | Holub et al. | 260/30.8 R |
| 4,408,000 | 10/1983 | Lee | 524/315 |

FOREIGN PATENT DOCUMENTS

1544788 4/1979 United Kingdom.

OTHER PUBLICATIONS

The Condensed Chemical Dictionary, Eighth Edition, p. 432.

Primary Examiner—Harold D. Anderson
Attorney, Agent, or Firm—Hedman, Gibson, Costigan & Hoare

[57] ABSTRACT

The intrinsic viscosity of a high molecular weight aromatic polycarbonate resin is reduced and the melt processability is concomitantly enhanced by the inclusion of a small amount of a fatty acid or acids. The mixture of polymer and acid is more readily extrudable, without detriment to other desirable physical and chemical properties.

15 Claims, No Drawings

PROCESS FOR PREPARING AROMATIC POLYCARBONATE OF IMPROVED MELT PROCESSABILITY WITH FATTY ACID

CROSS REFERENCE TO RELATED APPLICATION

This application is a continuation of U.S. patent application Ser. No. 687,010, filed Dec. 28, 1984 now abandoned.

BACKGROUND OF THE INVENTION

Aromatic polycarbonate resins are known engineering thermoplastics which can be molded into clear transparent articles that are suitable for various commercial purposes. The aromatic polycarbonates can be prepared by known processes, such as those described in the patent literature, for example, U.S. Pat. Nos. 3,153,008; 4,018,750; 4,123,436; and 4,469,861.

Many present commercial applications make desirable the good thermal and physical properties that are characteristic of aromatic polycarbonates. However, because of the size and complexity of the molds that are required in at least some of the cases, it would be advantageous to improve the melt processability of the polymer to achieve greater ease of flow through the extruder and into the mold. One way to achieve this is to use a polymer of lower molecular weight and, correspondingly, lower intrinsic viscosity. Typically, however, there are manufacturing problems associated with the preparation and isolation of commercial scale quantities of lower molecular weight aromatic polycarbonates, for instance, poly(bisphenol-A carbonates) having an intrinsic viscosity (I.V.) of less than 0.45 as measured in solution in chloroform ($CHCl_3$) at 25° C.

Thus, it has heretofore often been necessary to add agents which function to enhance the melt flow properties of the polymer. For instance, British Pat. No. 1,544,788 discloses high molecular weight aromatic polycarbonate resins prepared with chain stoppers comprised of a $C_9$ to $C_{26}$ carboxylic acid and a diphenol in combination. The polymer is described as having good mold release and mechanical properties. To improve the flow properties, they recommend the use of small amounts of a compound containing three or more functional groups, such as hydroxy groups (page 2, second column, lines 80-110 of the British patent).

SUMMARY OF THE INVENTION

The discovery has now been made that the intrinsic viscosity of a preformed aromatic polycarbonate resin can be reduced and the melt flow properties correspondingly enhanced by the inclusion of a small, effective amount of a fatty acid or acids. Typically, the additives are $C_9$ to $C_{26}$ carboxylic acids, for example, capric acid, myristic acid, palmitic acid, stearic acid, cerotic acid, mixtures of any of the foregoing, and so forth.

Only small amounts of the fatty acid need be employed. For instance, when a poly(bisphenol-A carbonate) resin is melt extruded with 0.5% by weight of stearic acid at 320° C., the intrinsic viscosity of the polymer is found to be reduced from 0.48 to 0.39 deciliters per gram (dl/g.) in methylene chloride at 25° C., relative to the untreated polymer. Moreover, this is accomplished without detriment to other desirable properties.

Without intending to be bound by any theory of the invention, it is postulated that the fatty acid acts as a polymer chain cleaving agent which breaks the polymer chains during high temperature processing, for instance, at those temperatures encountered in an extruder, thereby permitting better flow.

DETAILED DESCRIPTION OF THE INVENTION

In the preferred embodiments employed for the practice of this invention, the aforementioned fatty acids, which may be used individually or in mixtures of two or more, will be of the general formula

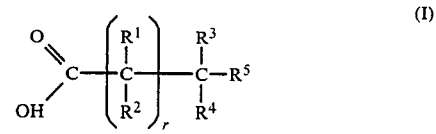

(I)

in which $R^1$, $R^2$, $R^3$, $R^4$ and $R^5$ are the same or different and are hydrogen or halogen, and r is an integer from 7 to 24.

Preferred embodiments will contain from about 0.2 to about 2.0 wt.% of the fatty acid or acids, based on the weight of the polycarbonate resin.

The aromatic polycarbonates for which this invention is useful are high molecular weight, thermoplastic homopolymers or copolymers, and preferably those comprised of units of the formula

(II)

in which A is a divalent radical of a dihydric phenol.

Especially preferred are aromatic polycarbonates having units of the formula

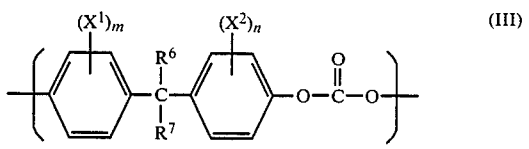

(III)

in which $R^6$ and $R^7$ are hydrogen, (lower) alkyl, or phenyl; $X^1$ and $X^2$ are (lower) alkyl or (lower) alkenyl; m and n are zero or independently integers from 1 to the maximum number of replaceable hydrogen atoms; and the average number of repeating units is at least 30, and usually from about 40 to about 300.

The terms "(lower)alkyl" and "(lower)alkenyl" refer to alkyl and alkenyl groups having from 1 to about 10 carbon atoms.

The preferred polycarbonates are typically characterized by a number average molecular weight from about 8,000 to about 100,000 or greater, and an intrinsic viscosity from about 0.43 to about 1.0 deciliters per gram as measured in solution in chloroform at 25° C.

Typical of the dihydric phenols useful as starting materials in the formation of the above polycarbonates are: 2,2-bis(4-hydroxyphenyl)propane(bis-phenol-A); hydroquinone; resorcinol; 2,2-bis(4-hydroxyphenyl)-pentane; 2,4'-dihydroxydiphenol methane; bis(2-hydroxyphenyl)methane; bis(4-hydroxy-5-nitrophenyl)methane; 1,1-bis(4-hydroxyphenyl)ethane; 3,3-bis(4-hydroxyphenyl)pentane; 2,2'-dihydroxydiphenyl; 2,6-dihydroxy naphthalene; bis(4-hydroxyphenyl)sulfone; 2,2'-dihydroxydiphenyl sulfone; 4,4'-dihydroxydiphenyl ether; and 4,4'-dihydroxy-2,5-diethoxydiphenyl ether. Especially preferred is bisphenol-A.

In the preparation of the carbonate polymers used in the instant invention only one dihydric phenol may be used. Alternately, a mixture of two or more different dihydric phenols may be employed.

The carbonate precursor which is employed can be a carbonyl halide, a diaryl carbonate, or a haloformate. The carbonyl halides can be carbonyl chloride, carbonyl bromide, and mixtures thereof. The haloformates suitable for use include mono- or bihaloformates of dihydric phenols (bischloroformates of hydroquinone, monochloroformate of bisphenol-A, etc.) or bishaloformates of glycols (bishaloformate of ethylene glycol, neopentyl glycol, polyethylene glycol, etc.) When using bishaloformates, equimolar amounts of free dihydric phenols are required to effect polymerization. When polymerizing monohaloformates of diphenols no free diphenol is required. The diaryl carbonates include diphenyl carbonate, di(halophenyl)carbonates such as di(chlorophenyl)carbonate, di(bromophenyl)carbonate, di(trichlorophenyl)carbonate, etc., di(alkylphenyl)carbonates such as di(tolyl)carbonate, etc., di(naphthyl)carbonate, di(chloronaphthyl)carbonate, and the like. The preferred carbonate precursor is carbonyl chloride, also known as phosgene.

One method of preparing the aromatic carbonate polymers involves the heterogenous interfacial polymerization technique utilizing an aqueous caustic solution, an organic water immiscible solvent such as methylene chloride, at least one dihydric phenol, a carbonate precursor such as phosgene, a catalyst, and a molecular weight regulator, and water.

Another useful method for preparing the carbonate polymers involves the use of an organic solvent system that also functions as an acid acceptor, at least one dihydric phenol, a molecular weight regulator, water, and a carbonate precursor such as phosgene.

The catalysts which may be employed are any of the suitable catalysts that aid the polymerization reaction of the dihydric phenol with the carbonate precursor to produce the polycarbonates. Suitable polymerization catalysts include, but are not limited to, tertiary amines such as triethylamine, quaternary ammonium compounds, and quaternary phosphonium compounds.

The molecular weight regulators employed may be any of the well known compounds that regulate the molecular weight by a chain terminating mechanism. These compounds include, but are not limited to, phenol, tertiary butyl phenol, Chroman-I, para cumylphenol, and the like.

The temperature at which the phosgenation reaction proceeds may vary from below 0° C. to above 100° C. The reaction proceeds satisfactorily at temperatures from room temperature (25° C.) to about 50° C. Since the reaction is exothermic, the rate of phosgene addition may be used to control the reaction temperature.

Addition of the melt flow enhancer, the compound of formula (I) above, may be accomplished in any convenient manner. For instance, the compound, or mixture of compounds is desired, may be dry blended with the polymer resin powder, as on a mechanical mixer. The compound or compounds may be dissolved in a mutual solvent with the polymer and coprecipitated. As another alternative, the compound may be introduced into a melt of the polymer through a porthole in an extruder.

Use of the compound in the prescribed amounts will normally result in a reduction in the intrinsic viscosity of the polycarbonate of at least 0.02 deciliters per gram (dl/g.), as measured in a solution of the polymer in chloroform at 25° C.

The treated polymer is also useful in combination with other polymers and/or additives conventionally employed with thermoplastic polymers, for example, antioxidants, stabilizers, colorants, mold release agents, flame retardants, mineral fillers (e.g., clay), reinforcing fillers (e.g., glass fibers), impact modifiers, and so forth. Any of these supplementary ingredients may be employed in the standard or usual amounts in the present compositions.

The treated polycarbonate and blends thereof are utilizable in processes for the production of shaped molded articles. Illustratively, in one procedure a mixture of the polycarbonate and compound, alone or in combination with additional ingredients, is passed through an extruder at a temperature above the glass transition temperature of the polymer (the temperature at which the polymer begins to soften), for example, from about 250° to about 320° C., then injection molded, for example, at a temperature from about 250° to about 320° C. (40° to 100° C. mold temperature).

The invention is further illustrated in the following examples.

DESCRIPTION OF THE SPECIFIC EMBODIMENTS

EXAMPLE I

In a Haake mixing bowl heated to 320° C. was placed 50 grams of poly(bisphenol A carbonate) having an intrinsic viscosity of 0.57 dl/g in chloroform at 25° C., and 1.0% by weight Hystene 5016 (a mixture of stearic and palmitic acids available from Witco Chemical). After eight minutes a sample of resin was removed and analyzed. The intrinsic viscosity was 0.41 dl/g. The use of the mixture of fatty acids is demonstrated to result a significant decrease in the intrinsic viscosity and this translates into a significant increase in the melt flow of the polymer and an increase in the ease of molding.

EXAMPLE II

Following the procedure described in Example I, BPA polycarbonate with an initial i.v. of 0.52 dl/g (as measured in chloroform) was treated with 0.50 weight percent Hystene 5016 at 320° C. Samples were taken with time. Analysis revealed:

| TIME (min) | INTRINSIC VISCOSITY (dl/g in CHCl$_3$) |
| --- | --- |
| 2 | .51 |
| 4 | .48 |
| 6 | .45 |
| 8 | .44 |

EXAMPLE III

Following the procedure described in Example I, BPA polycarbonate with an initial i.v. of 0.52 dl/g (as measured in chloroform) was treated with 0.75 weight percent Hystene 5016 at 320° C. Samples were taken with time. Analysis revealed:

| TIME (min) | INTRINSIC VISCOSITY (dl/g in CHCl$_3$) |
| --- | --- |
| 2 | 0.50 |

-continued

| TIME (min) | INTRINSIC VISCOSITY (dl/g in CHCl₃) |
|---|---|
| 4 | 0.46 |
| 6 | 0.43 |
| 8 | 0.42 |

EXAMPLE IV

Following the procedure described in Example I, BPA polycarbonate with an initial i.v. of 0.52 dl/g (as measured in chloroform) was treated with 1.0 weight percent Hystene 5016 at 320° C. Samples were taken with time. Analysis revealed:

| TIME (min) | INTRINSIC VISCOSITY (dl/g in CHCl₃) |
|---|---|
| 2 | 0.44 |
| 4 | 0.40 |
| 6 | 0.39 |
| 8 | 0.39 |

EXAMPLE V

Following the procedure described in Example I, BPA polycarbonate with an initial i.v. of 0.52 dl/g (as measured in chloroform) was treated with 1.25 weight percent Hystene 5016 at 320° C. Samples were taken with time. Analysis revealed:

| TIME (min) | INTRINSIC VISCOSITY (dl/g in CHCl₃) |
|---|---|
| 2 | 0.43 |
| 4 | 0.38 |
| 6 | 0.36 |
| 8 | 0.36 |

EXAMPLE VI

Following the procedure described in Example I, BPA polycarbonate with an initial i.v. of 0.52 dl/g (as measured in chloroform) was treated with 1.5 weight percent Hystene 5016 at 320° C. Samples were taken with time. Analysis revealed:

| TIME (min) | INTRINSIC VISCOSITY (dl/g in CHCl₃) |
|---|---|
| 2 | 0.41 |
| 4 | 0.35 |
| 6 | 0.34 |
| 8 | 0.34 |

EXAMPLE VII

Following the procedure described in Example I, BPA polycarbonate with an initial i.v. of 0.52 dl/g (as measured in chloroform) was treated with 1.25 weight percent Hystene 5016 at 280° C. Samples were taken with time. Analysis revealed:

| TIME (min) | INTRINSIC VISCOSITY (dl/g in CHCl₃) |
|---|---|
| 2 | 0.47 |
| 4 | 0.43 |
| 6 | 0.38 |

-continued

| TIME (min) | INTRINSIC VISCOSITY (dl/g in CHCl₃) |
|---|---|
| 8 | 0.36 |

EXAMPLE VIII

Following the procedure described in Example I, BPA polycarbonate with an initial i.v. of 0.52 dl/g (as measured in chloroform) was treated with 1.25 weight percent Hystene 5016 at 300° C. Samples were taken with time. Analysis revealed:

| TIME (min) | INTRINSIC VISCOSITY (dl/g in CHCl₃) |
|---|---|
| 2 | 0.45 |
| 4 | 0.39 |
| 6 | 0.37 |
| 8 | 0.36 |

EXAMPLE IX

Following the procedure described in Example I, BPA polycarbonate with an initial i.v. of 0.52 dl/g (as measured in chloroform) was treated with 1.25 weight percent Hystene 5016 at 340° C. Samples were taken with time. Analysis revealed:

| TIME (min) | INTRINSIC VISCOSITY (dl/g in CHCl₃) |
|---|---|
| 2 | 0.43 |
| 4 | 0.37 |
| 6 | 0.34 |
| 8 | 0.34 |

EXAMPLE X

A poly(bisphenol-A carbonate) resin, having an intrinsic viscosity of 0.48 dl/g in chloroform at 25° C., was mixed with 0.5% by weight of Hystene 5016, extruded through a one-inch Haake powder screw extruder at 320° C., cooled, cut into pellets, and injection molded into test pieces at 288° C. (88° C. mold temperature). During the extrusion, samples of the melt were removed for analysis.

For comparison, the same polymer with and without stearic acid added was processed under identical conditions. Properties are shown in the Tables below for both the mixture of polymer and acid (indicated as "modified") and the polymer alone ("unmodified").

TABLE 1

| FLOW PROPERTIES | Modified Polycarbonate | Unmodified Polycarbonate |
|---|---|---|
| Melt flow, g/10 min- | 37.5 | 15 |
| Ki | 850 | 2130 |
| Spiral flow: 1/16 inch Melt temp./Mold temp. | | |
| 500° F./175° F. | 9 | — |
| 575° F./155° F. | 15 | 8.8 |
| 550° F./200° F. | 12.7 | 9 |
| Spiral flow: ⅛ inch Melt temp./Mold temp. | | |
| 575° F./175° F. | 44 | 28 |

TABLE 2

| MOLDED PROPERTIES | | |
|---|---|---|
| | Modified Polycarbonate | Unmodified Polycarbonate |
| Heat distortion temp., °F. at 264 psi | 250 | 256 |
| Notched Izod impact strength, ft. lbs./in. n. | 14.6 | >15 |
| Gardner impact strength, in. lbs. | >320 | >320 |
| Flexural modulus, psi | 366,000 | 340,000 |
| Flexural strength, psi | 14,800 | 13,500 |
| I.V. (CHCl₃ at 25° C.) dl/g | 0.39 | 0.48 |

All of the patents mentioned above are incorporated herein by reference.

Other modifications and variations of the invention are possible in view of the description which has been provided. It should be understood, therefore, that changes may be made in the specific embodiments shown which are still within the scope of the invention as defined in the appended claims.

We claim:

1. A process for enhancing the melt flow of a preformed high molecular weight aromatic polycarbonate resin, comprising mixing with the resin, after it has been fully formed, an intrinsic viscosity reducing amount of a polymer chain cleaving agent comprising one or more fatty acids having the formula

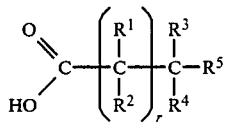

in which $R^1$, $R^2$, $R^3$, $R^4$ and $R^5$ are the same or different and are hydrogen or are selected from the group consisting of fluorine, chlorine, bromine and iodine, and r is an integer from 7 to 24, and heating the mixture at a temperature greater than about 280° C. for a time sufficient to reduce the intrinsic viscosity of the aromatic polycarbonate by at least 0.02 deciliters per gram as measured in solution in chloroform at 25° C.

2. A process according to claim 1, in which the aromatic polycarbonate comprises units of the formula

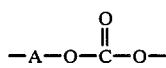

in which A is a divalent radical of a dihydric phenol.

3. A process according to claim 1, in which the aromatic polycarbonate comprises repeating units of the formula

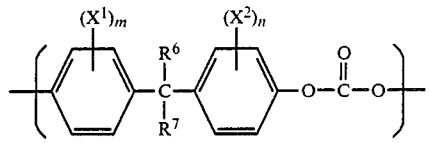

in which $R^6$ and $R^7$ are hydrogen, (lower) alkyl or phenyl; $X^1$ and $X^2$ are (lower) alkyl or (lower) alkenyl; m and n are zero or integers from 1 to the maximum number of replaceable hydrogen atoms on the ring (four).

4. A process according to claim 2, in which the aromatic polycarbonate, prior to the addition of the polymer chain cleaving agent, has an average number of repeating units of at least 30.

5. A process according to claim 3 in which the aromatic polycarbonate, prior to the addition of the polymer chain cleaving agent, has an average number of repeating units from about 30 to about 300.

6. A process according to claim 3, in which the aromatic polycarbonate, prior to the addition of the polymer chain cleaving agent, has an intrinsic viscosity of from about 0.43 to about 1.0 deciliters per gram as measured in solution in chloroform at 25° C.

7. A process according to claim 1, in which the aromatic polycarbonate is poly(bisphenol-A carbonate).

8. A process according to claim 1, in which the polymer chain cleaving agent comprises stearic acid.

9. A process according to claim 8 in which the stearic acid is added in an amount sufficient to cleave said polycarbonate and to reduce the intrinsic viscosity of said polycarbonate at least 0.05 deciliters per gram as measured in solution in chloroform at 25° C.

10. A process according to claim 1, in which the polymer chain cleaving agent comprises a mixture of stearic and palmitic acids.

11. A process according to claim 1, wherein said polymer chain cleaving agent comprises an amount of from about 0.5 to about 1.5 weight percent, based on said polycarbonate.

12. A process according to claim 1 wherein said heating is carried out at a temperature of from about 280° C. to about 340° C.

13. A process according to claim 1 wherein said heating is carried out for at least about two minutes.

14. A process according to claim 1 wherein said polymer chain cleaving agent comprises at least about 0.5 weight percent based on said polycarbonate and wherein said heating is carried out at a temperature greater than about 280° C. for a time in excess of about two minutes.

15. A process according to claim 1 wherein said heating is carried out to obtain a cleaved polymeric material.

* * * * *